Patented Apr. 9, 1940

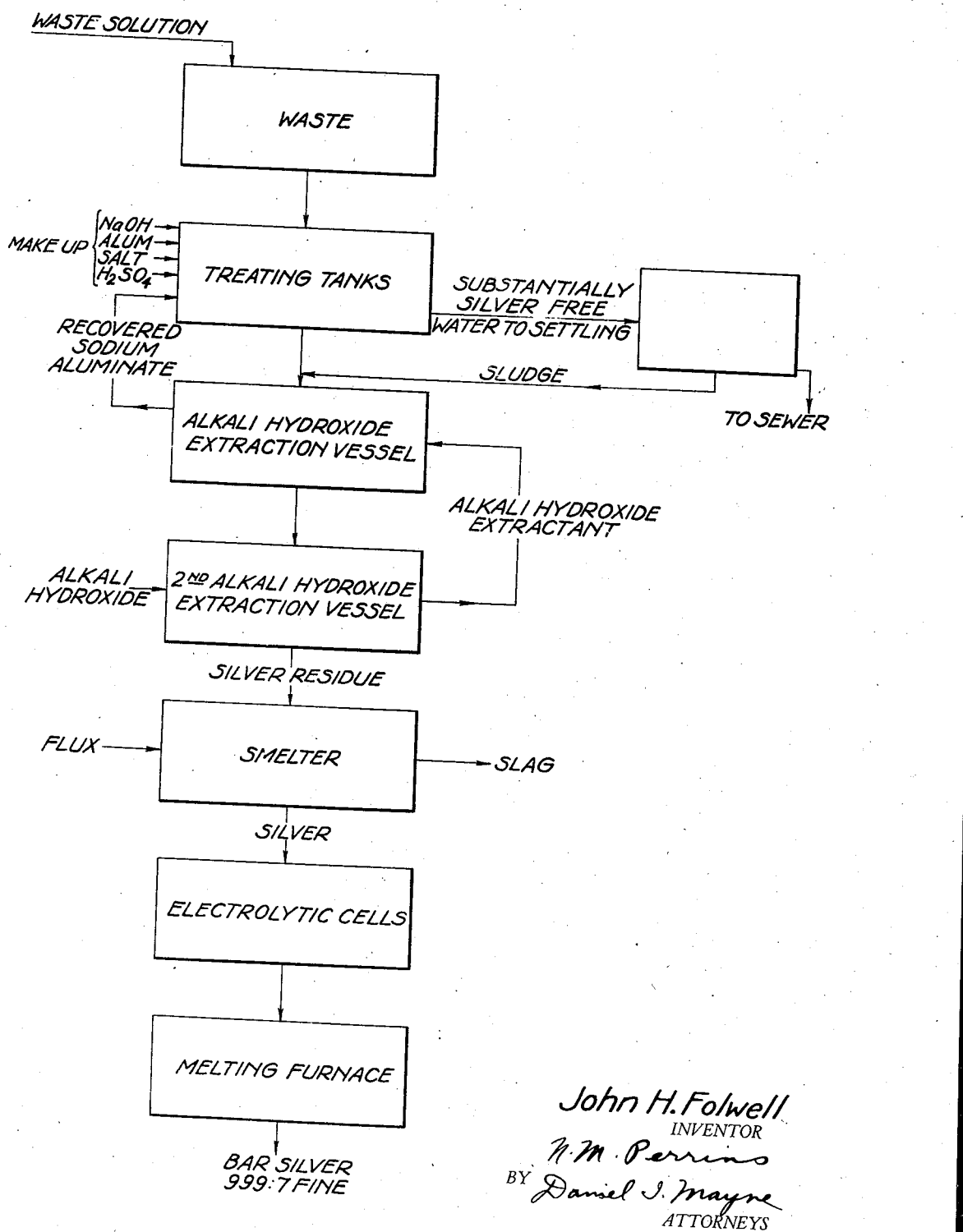

2,196,764

UNITED STATES PATENT OFFICE 2,196,764

SILVER RECOVERY USING AN ALKALI HYDROXIDE

John H. Folwell, Rochester, N. Y., assignor to Eastman Kodak Company, Rochester, N. Y., a corporation of New Jersey Application August 31, 1938, Serial No. 227,822

11 Claims. (Cl. 75—118)

This invention relates to a method of producing or recovering valuable metals from sources which contain only small or minute amounts of such metals or metal containing components, and more particularly this invention relates to processes for recovering silver from solutions, such as those obtained from photographic processes, containing only small amounts of silver or silver components.

A number of methods have been described for recovering metals from such sources. For example, in Hickman et al. application Serial No. 135,-952 and Marvin J. Reid application Serial No. 135,953, now Patent Nos. 2,131,045 and 2,131,072, certain methods for obtaining or recovering valuable metals are described which are particularly satisfactory.

My invention is concerned with a similar type process but a process which is more advantageous in certain respects than the aforementioned processes.

As pointed out in those applications the problem of recovering precious metals from sources containing only small or minute quantities of such metals involves not only the technical problems of working with such small quantities, but in addition, there is the economic problem in keeping the cost of operation such that the recovery of such metals will be profitable.

I have found a method for recovering metals from sources which contain only small or minute amounts thereof, and particularly silver from waste solutions obtained in photographic operations, by procedure requiring lower quantities of treating constituents than heretofore required and otherwise possessing certain advantages.

This invention has for one object to provide a process for obtaining or recovering valuable metals from various sources containing only small or minute quantities of such metal or metal-containing constituents. Another object is to provide a process for recovering metals from sources containing only small or minute quantities thereof, wherein the recovery is substantially complete. A further object is to provide a process for recovering small quantities of metals which is simple and economical in operation. A still further object is to provide a recovery process in which a minimum quantity of the treating materials will be required. Still another object is to provide a metal recovery process wherein at least a portion of the treated materials consumed therein may be recovered or regenerated from constituents obtained in the process.

Still another object is to provide a process particularly adapted for recovering silver from liquids obtained from various photographic processes or materials. Another object is to provide a silver recovery process particularly adapted for use in the treatment of wash solutions, scrap film and other waste obtained in photographic processes. Still another object is to provide a process of recovering silver wherein the silver recovered is of relatively high quality. Still another object is to provide a process for the recovery of valuable constituents from waste photographic solutions by relatively simple procedure not requiring special equipment and materials. Other objects will appear hereinafter.

These objects are accomplished by my invention, which includes the steps of treating the various sources of the metal with certain chemicals, whereby the valuable metals are obtained in a sludge, which sludge may be treated with certain chemicals of an alkaline nature to regenerate treating agent as well as eliminate some of the organic content of the sludge, thereby improving the sludge so that the metal may be recovered therefrom by smelting procedure requiring a minimum of fluxing agents. In my process, since alkaline constituents are used, equipment adapted to resist strong acids or other special equipment is not required.

For a still further understanding of my invention, reference is made to the attached drawing forming a part of the present application. This drawing is in the nature of a flow sheet graphically illustrating steps which may be employed in carrying out my invention.

The following example is set forth for illustrating one embodiment of my process and the example will be described with particular reference to the drawing. It is to be understood that the values referred to in the example are primarily for the purposes of illustration and are not to be construed as a limitation upon my invention.

The materials containing only minute or small quantities of the metal to be recovered, would be collected in a container designated waste on the attached drawing. For example, the various wash waters obtained from washing photographic film, film scrap, or from various other photographic processes would be collected at this point. These particular liquids, in the examples under description, would contain silver, a quantity of 1 or 2 ounces per 100 gallons of liquid. This silver might be in the form of silver, silver bromide, or other substantially insoluble silver salt.

The solutions so collected would be brought to the proper pH either by acid or alkali addition, as the case might require. Preferably, a pH around 5.5 to 7.5 would be desired. The liquid would be treated, assuming the process is being put into operation, with sulfate as aluminum sulfate, salt, as for example, sodium chloride, and a suitable base. Inasmuch as a sulfate has been specified, sodium hydroxide would be the base preferred. It is to be noted that the process could also be started with an amphoteric salt such as sodium aluminate, in which instance an acid such as sulfuric acid would be employed. Or, for example, acid in conjunction with aluminum sulfate could be employed. These constituents function to throw the soluble silver materials out of solution and to form a floc, presumably aluminum hydroxide, which carries the silver to the lower portion of the container, by gravity settling. As indicated, this procedure is employed at the start of the process. After the process has been in operation the materials returned to the initial tank supply the bulk of the treating components, in accordance with procedure to be set forth in detail hereinafter. However, one or more of the aforementioned constituents may be added with the returned constituents.

The aforementioned operations, namely, treating waste liquid and permitting a sludge to settle, may be repeated for several times, until sufficient quantities of sludge have accumulated. The supernatant, clear liquid in each instance may be drawn off and preferably is passed into another settling unit where any particles of sludge may be recovered and returned to the extraction tank.

The sludge obtained by treating waste in the treating tanks is passed to the extraction vessel where it is treated with a strong alkali, as for example sodium hydroxide. The reaction which appears to take place comprises:

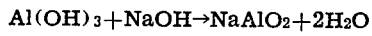

$$Al(OH)_3 + NaOH \rightarrow NaAlO_2 + 2H_2O$$

A quantity of alkali hydroxide sufficient to carry out this reaction would be present in the extraction vessel and preferably some excess hydroxide. The excess not only promotes the reaction in the desired direction, but reacts with some of the organic constituents present, such as gelatin, removing them from the silver-laden sludge.

This treatment with caustic may take place in one or more units as shown in the attached drawing. The over-flow caustic from one unit may be passed to the next unit and finally the recovered sodium aluminate, which may be used as treating agent, is conducted to the treating tank.

Preferably the treatment of the silver-laden sludge with alkali hydroxide would be within a few days after the sludge was obtained. However, if desired, substantial quantities of the sludge may be accumulated prior to caustic treatment.

This caustic treatment not only regenerates a material which may be used in the treating step, but the character of the silver-laden sludge is greatly improved. Since the sludge, after such treatment, has a pH substantially above 8, smaller amounts of flux are required in subsequent smelting treatment. Also, the sludge contains carbonaceous material, as for example gelatinous constituents. By my sodium hydroxide treatment, these carbonaceous materials may be slightly or substantially reduced, as may be desired.

In addition, the treatment of the silver-bearing sludge with caustic solutions reduced the sulphides and sulphur-bearing compounds which are troublesome in the smelting operation, in that they increase the retention of silver in the slag. I have found, for example, that the slags from a sludge produced by my process, having a sulphur content of 1.6%, contain only 10 oz. silver per ton, compared with as high as 200 to 300 oz. per ton in slags from sludge containing 5.3% sulphur.

This improved sludge, which will contain a substantial quantity of silver, is then conducted to smelting treatment. As indicated, smaller amounts of flux such as sodium carbonate, borax and silica are required than heretofore used. Preferably, the flux would be thoroughly mixed with the sludge in a mechanical mixer, for example.

The silver-containing materials in the presence of flux, are thereafter subjected to a smelting operation. As indicated, I have found that very little silver, in my process, is lost in the slag. The resultant molten silver may be poured into silver anodes, or otherwise employed. The anodes may then be electrolyzed and the resultant electrolytic silver may be remelted into a particularly high-grade product.

As indicated, my novel process consumes a lower quantity of treating material than formerly thought required in similar processes. An explanation of this lower requirement is as follows: However, it is to be understood that I do not wish to be bound as to any particular theory of process operation. In processes employing an acid for reducing the sludge volume, the reaction which took place, based on 2 moles of aluminum, was apparently:

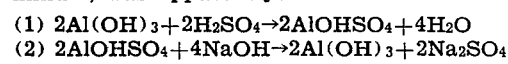

(1) $2Al(OH)_3 + 2H_2SO_4 \rightarrow 2AlOHSO_4 + 4H_2O$
(2) $2AlOHSO_4 + 4NaOH \rightarrow 2Al(OH)_3 + 2Na_2SO_4$ Adding these equations will show that 2 moles of sulfuric acid and 4 moles of sodium hydroxide were required. In other words, the aluminum salts in the sludge, when treated with acid, went to the basic sulfate, and higher amounts of sulfuric acid and sodium hydroxide were required.

On the other hand, in accordance with my novel process described herein, using the same chemicals, smaller amounts were required. The aluminum salts were converted to sodium aluminate and lower quantities of both aluminum hydroxide and sulfuric acid were required in this procedure. For example, the following equations may represent the reaction which took place:

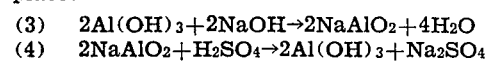

(3) $2Al(OH)_3 + 2NaOH \rightarrow 2NaAlO_2 + 4H_2O$
(4) $2NaAlO_2 + H_2SO_4 \rightarrow 2Al(OH)_3 + Na_2SO_4$ Adding Equations 3 and 4 in a similar manner, shows my process requires only 2 moles sodium hydroxide and 1 mole sulfuric acid.

While in the aforementioned example I have described the use of sodium hydroxide, inasmuch as this is a readily available commercial material, mixture thereof with potassium hydroxide or potassium hydroxide alone, may be employed. Likewise, various other salts such as zinc salts, of which sodium zincate is an example, may be employed. Gallium salts, sodium silicate, and the like, may also be employed alone or in conjunction with the aluminum or other salts. Likewise, while I prefer to use inorganic acids such as sulfuric, hydrochloric, and the like, various organic acids such as acetic, formic and the like may be used. The various steps of separating the sludge or silver laden concentrate obtained from the sludge from the liquids carried along therewith, may be carried out by centrifuging, drying, continuous settlers or thickeners or other procedure. While in some instances I have described a single or double treating step, it is to be understood that a plurality of steps may be employed, if desired.

Hence, I do not wish to be restricted in my invention, excepting insofar as is necessitated by the prior art and the spirit of the appended claims.

What I claim and desire to be secured by Letters Patent of the United States is:

1. A process for the recovery of silver suitable for photographic purposes from waste liquids obtained from photographic processes containing only small amounts of silver, which comprises adjusting the pH of said liquids to between approximately 6–8, treating the liquids with aluminum sulfate, salt, and an alkali hydroxide, whereby a floc is formed that causes the deposition of a silver-laden sludge, drawing off from the sludge supernatant liquid, further settling said liquid for the recovery of further sludge, treating the sludge with sodium hydroxide for causing the reaction:

$$Al(OH)_3 + NaOH \rightarrow NaAlO_2 + 2H_2O$$

for converting the aluminum salts present in the sludge to sodium aluminate, returning at least a part of this sodium aluminate with sulfuric acid, to the aforementioned treating step, subjecting the treated silver laden sludge to smelting in the presence of an alkali flux of sodium carbonate, borax and silica, forming the resultant molten silver into electrodes and subjecting the electrodes to electrolysis for the further purification thereof.

2. The process for recovering silver from liquids containing only small amounts thereof, which comprises treating said liquids with an aluminate and an inorganic acid, whereby a floc is formed, which carries down the silver to form a silver-laden sludge, withdrawing the supernatant water to a settling treatment for recovering further sludge therefrom, treating the sludge with sodium hydroxide for regenerating further aluminum treating agent, returning at least a portion of the regenerated treating agent to the treating step in the presence of the inorganic acid, smelting the silver-laden residue in the presence of an alkali flux, and electrolyzing silver obtained from the smelting step.

3. A process for recovering silver from waste solutions obtained from processes of treating photographic materials, which comprises treating said solutions with sodium aluminate and inorganic acid for forming a floc, which carries down the silver materials to form a silver-containing sludge, treating the sludge with sodium hydroxide for regenerating further aluminate, returning at least a part of this aluminate to the first step, smelting the silver residue from the sodium hydroxide treatment in the presence of an alkali flux, and further treating the silver from the smelting treatment.

4. A process for recovering silver from solutions containing only small amounts thereof, which comprises treating said solutions with sodium aluminate and an inorganic acid for obtaining silver laden sludge, treating the sludge with sodium hydroxide for removing aluminum salts therefrom, and subjecting the treated sludge to smelting in the presence of an alkali flux, whereby smaller quantities of flux are required, due to the prior alkali treatment.

5. In a process for recovering silver from liquids obtained from photographic materials by procedure which includes segregating the silver into an aluminum and silver-containing sludge, by means including a treatment with an aluminum hydroxide, the steps which comprise treating sludge with caustic sufficient to convert a substantial part of the aluminum hydroxide in accordance with the following equation:

$$Al(OH)_3 + NaOH \rightarrow NaAlO_2 + 2H_2O$$

6. A process of recovering silver from silver-containing sludge having an aluminum salt present, the steps which comprise treating the sludge with sodium hydroxide and then subjecting the treated sludge to smelting treatment in the presence of an alkali flux, whereby a lower quantity of flux is required.

7. A process of treating a sludge containing silver, carbonaceous organic materials and aluminum hydroxide, which comprises reacting the sludge with sufficient sodium hydroxide to convert a substantial part of the aluminum hydroxide to sodium aluminate, and to remove at least a portion of the carbonaceous material from the sludge and recovering silver from the sludge materials remaining.

8. A process for recovering silver from solutions obtained from waste photographic materials by procedure wherein the silver is segregated from the solution into a silver-bearing sludge containing an amphoteric salt, which sludge is thereafter treated and subjected to smelting, the steps of improving the sludge prior to the smelting thereof, which comprises treating said sludge with an alkali material which reduces the volume of the sludge, and separating at least a part of the liquid resulting from this alkali treatment.

9. In the recovery of silver from waste photographic solutions, by procedure including forming a silver-containing sludge, and subjecting the sludge to smelting in the presence of slag, the steps for preventing loss of silver in the slag which comprises treating said sludge prior to smelting with a strong alkali which acts upon at least a part of the sulfur-bearing compounds therein, and forms an alkali solution, removing solution from contact with the sludge residue and subsequently carrying out said smelting.

10. A process for recovering at least one silver constituent present in small quantities in aqueous liquids, which comprises subjecting said liquid to a treatment including the use of an amphoteric metal salt for causing the deposition of said silver constituent in a sludge, at least partially isolating the sludge and thereafter treating the sludge with a reagent which causes the formation of a component essentially comprising said amphoteric metal salt.

11. A process for recovering silver constituents from liquids obtained from photographic materials, which comprises subjecting the liquid to a deposition treatment for obtaining a sludge which contains silver constituents, treating the sludge with an alkali reagent which reforms a material which may be used in said deposition treatment, and returning at least a part of this reformed material for use in the deposition of further silver-containing sludge.

JOHN H. FOLWELL.